United States Patent
Anantharaju

(10) Patent No.: US 11,823,200 B2
(45) Date of Patent: Nov. 21, 2023

(54) SMART PHYSICAL PAYMENT CARDS

(71) Applicant: Oracle International Corporation, Redwood Shores, CA (US)

(72) Inventor: Girish Anantharaju, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 84 days.

(21) Appl. No.: 16/920,935

(22) Filed: Jul. 6, 2020

(65) Prior Publication Data

US 2021/0012348 A1 Jan. 14, 2021

Related U.S. Application Data

(60) Provisional application No. 62/871,465, filed on Jul. 8, 2019.

(51) Int. Cl.
*G06Q 40/00* (2023.01)
*G06Q 20/40* (2012.01)
(Continued)

(52) U.S. Cl.
CPC ..... *G06Q 20/4016* (2013.01); *G06Q 20/3278* (2013.01); *G06Q 20/352* (2013.01);
(Continued)

(58) Field of Classification Search
CPC ........... G06Q 20/4016; G06Q 20/3278; G06Q 20/352; G06Q 20/353; G07F 7/082; G07F 7/0893

See application file for complete search history.

(56) References Cited

U.S. PATENT DOCUMENTS 4,745,267 A * 5/1988 Davis ................... G06Q 20/347 713/185
5,326,964 A * 7/1994 Risser .................... B42D 25/20 235/487

(Continued)

FOREIGN PATENT DOCUMENTS

| GB | 2460864 A | 12/2009 |
| IN | 201911004740 | 2/2019 |
| KR | 10-2003-0034381 A | 5/2003 |

OTHER PUBLICATIONS

Citi Launches Credit Card Scanning Ability Within Mobile App, available online at <https://www.citigroup.com/citi/news/2017/170127a.htm>, Jan. 27, 2017, 5 pages.

(Continued)

*Primary Examiner* — Rajesh Khattar
(74) *Attorney, Agent, or Firm* — Invoke

(57) ABSTRACT

One or more embodiments include obtaining information from a physical payment card. Based on the information from the physical payment card, an output is obtained that includes a valid account number corresponding to the physical payment card. The valid account number is displayed to the cardholder. The physical payment card does not contain a visual indication of the valid account number and thus cannot be used by a malicious entity. One or more embodiments may include a physical payment card. The physical payment card includes a fake account number that cannot be used for executing a transaction based on funds associated with the physical payment card. They physical payment card may also include a key that can be mapped to a valid account number that can be used for executing a transaction based on funds associated with the physical payment card.

5 Claims, 4 Drawing Sheets

(51) Int. Cl.
G06Q 20/32 (2012.01)
G07F 7/08 (2006.01)
G06Q 20/34 (2012.01)

(52) U.S. Cl.
CPC ........... *G06Q 20/353* (2013.01); *G07F 7/082* (2013.01); *G07F 7/0893* (2013.01)

(56) References Cited

U.S. PATENT DOCUMENTS

| | | | |
|---|---|---|---|
| 8,678,288 | B2 | 3/2014 | Eng |
| 9,703,988 | B1 | 7/2017 | Sudbury et al. |
| 9,922,319 | B2 | 3/2018 | Kobayashi |
| 10,373,041 | B1 | 8/2019 | Benkreira et al. |
| 10,380,580 | B1* | 8/2019 | Seetharam ....... G06K 19/06112 |
| 2004/0094617 | A1 | 5/2004 | Hogans |
| 2007/0073619 | A1 | 3/2007 | Smith |
| 2008/0071681 | A1 | 3/2008 | Khalid |
| 2011/0251869 | A1* | 10/2011 | Shekhter ............ G06Q 10/0635 705/7.28 |
| 2011/0276425 | A1 | 11/2011 | Mullen |
| 2012/0123942 | A1* | 5/2012 | Song .................. G06Q 20/4014 705/44 |
| 2015/0206131 | A1* | 7/2015 | Phillips .................. G06Q 20/34 705/41 |
| 2016/0239835 | A1* | 8/2016 | Marsyla ............. G06Q 20/3829 |
| 2018/0288043 | A1* | 10/2018 | Sims ..................... H04L 63/102 |
| 2019/0236589 | A1* | 8/2019 | Garrett ............... G06Q 20/3278 |

OTHER PUBLICATIONS

Online credit card number generator, available online at, <https://www.mobilefish.com/services/credit_card_number_generator/credit_card_number_generator.php>, 8 pages.

* cited by examiner

SMART PHYSICAL PAYMENT CARDS

INCORPORATION BY REFERENCE

The following application is hereby incorporated by reference: application no. 62/871,465 filed on Jul. 8, 2019. The Applicant hereby rescinds any disclaimer of claim scope in the parent application or the prosecution history thereof and advises the USPTO that the claims in this application may be broader than any claim in the parent application.

TECHNICAL FIELD

The present disclosure relates to payment processing. In particular, the present disclosure relates to a payment processing card where the account number of the payment processing card is obfuscated.

BACKGROUND

The usage rate of cash for payment transactions has been declining for years. Recent surveys have discovered that only fourteen percent of American consumers prefer using cash for payments. The remainder of payment transactions are electronic, using payment processing cards (also known as payment cards), such as debit cards and credit cards.

There are two main types of payment processing card transactions. The first type of transaction includes a card-based transaction. A card-based transaction, as referred to herein, may be referred to as a "card present" ("CP") transaction in the industry (see https://www.cardfellow.com/blog/card-present-card-not-present-definition/). In a card-based transaction, non-human readable information that is encoded in the physical payment card is electronically read. The non-human readable information may be encoded, for example, in a chip or a magnetic stripe of the physical payment card. The encoded information may be electronically read by, for example, a Point-Of-Sale (POS) payment processing card reader. The transaction is executed based on the electronically read, non-human readable information encoded in the physical payment card.

A second type of transaction includes a card-not-needed transaction. A card-not-needed transaction, as referred to herein, may be referred to as a "card not needed" or "card not present" ("CNP") in the industry even though the card being present or not present has no bearing on a card-not-needed transaction. See https://en.wikipedia.org/wiki/Card_not_present_transaction. A card-not-needed transaction is generally based on human readable information that is visible and printed on the front or back of the payment card. A user obtains the human readable information from the payment card. A user may, for example, read the human readable information or take a picture of the human readable information. The user typically submits the human readable information via manually inputting the human readable information using electronic means (such as a web interface, over the telephone, or using a mobile application (or "app") on a smartphone). Transactions conducted over a telephone using either voice or fax technology also may be a card-not-needed transaction. A payment processing system executes the transaction based on the human readable information.

While there are new safeguards in place to protect card-based transactions, there is a possibility that the human readable information may be inappropriately copied by a malicious entity and used in a card-not-needed transaction.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
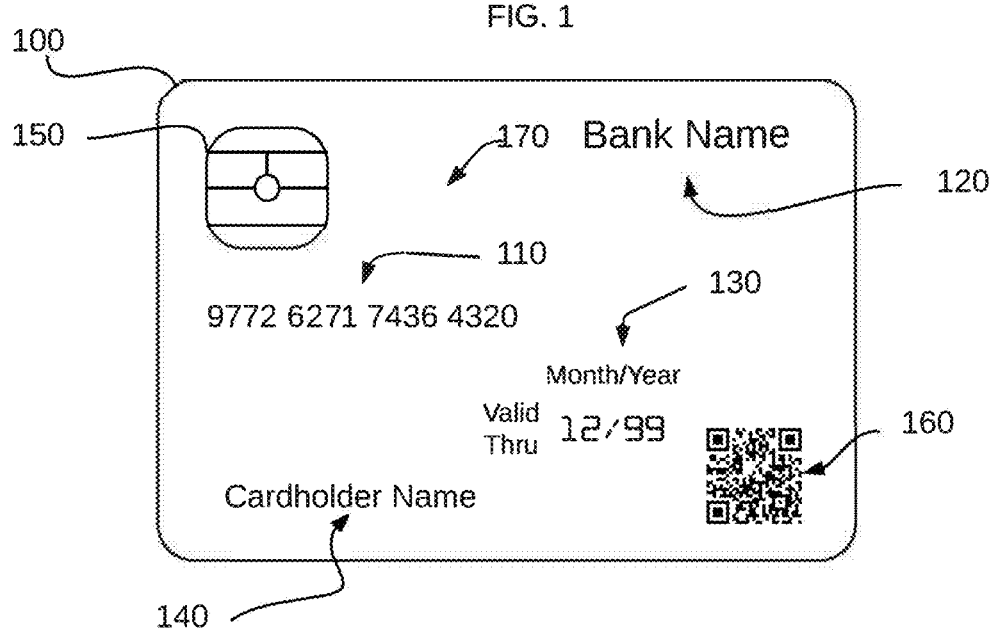
FIG. 1 illustrates a physical payment card.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. INTRODUCTION
2. GENERAL OVERVIEW
3. PAYMENT CARD
4. MALICIOUS ENTITY'S USE OF PAYMENT CARD
5. CARDHOLDER'S USE OF PAYMENT CARD
6. HARDWARE OVERVIEW

1. Introduction

An issue present in all types of transactions using payment cards is the issue of fraud. A merchant wants to ensure that the holder of the payment card is an authorized user of the card. A cardholder wants to ensure that the cardholder's account is not compromised by a malicious entity trying to use the account to purchase goods. A financial institution or other payment card issuer also wants to minimize fraud. When fraud occurs, the liability for the fraud generally belongs to one of the merchant, the cardholder, or the financial institution, depending on various laws and regulations regarding card payment transactions.

Traditionally, a payment card includes a magnetic stripe that stores the account number and other relevant information. An issue that can occur with a magnetic stripe is "skimming" or reading the information on the magnetic stripe and later using the information to make other transactions. This is possible because the information on the magnetic stripe is not encrypted and can be read by any magnetic stripe reader. The information can later be placed on another magnetic stripe and used for in person transactions. The information can be used for card-not-needed transactions, such as by making purchases over the Internet.

Europay, MasterCard and Visa (EMV) technology was developed to prevent some types of fraud. In an EMV transaction, an integrated circuit is placed in the payment card. The payment card is then inserted into a reader where data is read and processed in a secure manner. It is much more difficult to gather information from an EMV card. In addition, even cloning the magnetic stripe of an EMV card is less useful, because a card reader with EMV capabilities will typically require a card-based transaction to use EMV.

A vulnerability still exists, however, because the cardholder's account information is typically printed or embossed on the payment card. Even if a malicious entity cannot access the cardholder's account data using electronic methods, the malicious entity may be able to simply write down (or photograph) the payment card to obtain the information, such as the account number, expiration date, and card security code that can later be used in a card-not-needed transaction.

One way a malicious entity can obtain such information is in a card-based transaction where the cardholder gives the payment card to the merchant and the card leaves the presence of the cardholder. As an example, in a restaurant setting, the cardholder remains seated in the restaurant while a waiter takes the card to a card payment terminal located remotely from the cardholder. The waiter may copy the information on the card by pen for subsequent improper use in a card-not-needed transaction.

2. Overview

One or more embodiments obfuscate the account number or other information that is typically printed on a payment card. The account number that is printed on a card is not electronically read in a card-based transaction. Therefore, it is not necessary to print the account number on the payment card. When the actual account number is not on the payment card, a malicious entity is unable to access the account number by reading the card.

Instead of printing the account number on the card itself, one or more embodiments print a key on a payment card that can be mapped to the account number by an account number mapping system. The key printed on the payment card can include, for example, an image, a bar code, a QR code or a set of random numbers. The key, printed on a payment card, may even include a fake account number which is similar in format to a real account number (e.g., a 16-digit number). However, the fake account number cannot be used to complete any transactions. In some cases, a key may be printed in a background area 170 of the card 100 in a way that is machine readable (e.g., via a mobile computing device camera). An authorized user, such as the cardholder, may obtain the actual account number by submitting the key to an account number mapping system. As an example, the user may submit a picture of the key through an application to obtain the account number through the application.

One or more embodiments described in this Specification and/or recited in the claims may not be included in this General Overview section.

3. Payment Card

FIG. 1 illustrates the front of a physical payment card (also known as a payment card) 100 in accordance with one or more embodiments. Physical payment card 100 includes a fake account number 110, a name and/or logo of the issuing financial institution 120, an expiration date 130, a cardholder name 140, an integrated circuit 150, and key 160. It should be understood that one or more of the account number 110, name 120, expiration date 130, and key 160 may not be present in some embodiments. Physical payment card 100 may be a debit card in that transactions that take place using physical payment card 100 are debited directly from a cardholder's bank account. Physical payment card 100 may be a credit card in that transactions that take place using physical payment card 100 are credited against a user's credit line. Physical payment card 100 may be a prepaid card, where a cardholder purchases a physical payment card 100 and places a set amount of money on the physical payment card 100. Physical payment card 100 may be any other type of payment card, now known or developed in the future In an embodiment, fake account number 110 corresponds to an account number that is in the format of a genuine account number (e.g., 16 digits printed in groups of 4 starting with a 4 for Visa, 16 digits printed in groups of 4 starting with a 5 for Mastercard, or 15 digits starting with a 3, in groups of 4, 6, and 5 for American Express). While the fake account number 110 may be in a correct account number format, the fake account number 110 cannot be used by itself to successfully execute a transaction. This is because the fake account number, despite a format consistent with a valid account number, is not in fact associated with an account number that may be used to execute financial transactions.

In some examples, the fake account number may be a random number or a partially random number in which the fake account number complies with an expected format but is formed from some digits that are selected randomly. In other examples, the fake account number may be selected from a set of fake numbers generated by the issuing financial institution that are intentionally not assigned to a corresponding financial account. One benefit of a fake account number, and in particular a randomly selected number, is that the fake account number may not be used by a malicious entity to identify the card holder. This provides an added level of security to the card holder by preventing the account number from being used as source of information by a malicious entity to research further personal and/or financial details associated with the card holder.

In some examples, the fake account number 110 may correspond to a cryptographic key that may be decoded using a secure application to surely access a valid account number. This example is described below in more detail.

In an embodiment, name and/or logo 120 corresponds to a name or logo of the issuing financial institution. As is known in the art, the bank or financial institution that issues the payment card often places their name or logo 120 on the card. This serves several purposes. For example, a cardholder with multiple payment cards may be able to distinguish between the multiple payment cards via the name of the financial institution. In some embodiments, there can be other features on the payment card in addition to or in place or the name or logo of the issuing financial institution. For example, some financial institutions allow the printing of logos of sports teams, famous characters, famous landmarks, famous paintings, or even cardholder supplied images as a background of physical payment card 100. One or more of these features can be used as key 160, detailed below.

In an embodiment, expiration date 130 corresponds to an expiration date of the payment card. As is known in the art, a physical payment card 100 typically has an expiration date. Once the expiration date has passed, the payment card is no longer valid. The result of such an expiration date 130 is that it allows a financial institution to maintain a mailing address of the cardholder, as the cardholder is not able to obtain a new payment card without supplying their mailing address to the financial institution. In addition, an expiration date 130 allows a cardholder's subscriptions to automatically lapse. A cardholder may subscribe to a service and forget about the subscription. By having the physical payment card 100 expire at predetermined intervals, a cardholder's subscriptions can be canceled without the cardholder taking additional action. In addition, a card-not-needed transaction may request that the cardholder supply certain information. Typical information includes the cardholder's name, the account number, and the expiration date. In some embodiments, expiration date 130 is an actual expiration date of the payment card. In some embodiments, expiration date 130 is a fake expiration date, with the actual expiration date being provided in a manner similar to that described below with respect to the fake account number 110.

In an embodiment, cardholder name 140 corresponds to the name of the cardholder. A physical payment card 100 typically includes the cardholder's name in order to identify the cardholder. In a card-not-needed transaction, the transaction typically requires that the name of the cardholder be identified. In a card-based transaction, the cardholder typically presents physical payment card 100 to a person in order to conduct the transaction or the user interacts manually with a POS terminal. In some transactions, an employee of the store where the transaction may confirm the identity of the cardholder by comparing cardholder name 140 to a government issued identification card supplied by the cardholder.

In an embodiment, integrated circuit 150 corresponds to an EMV chip or any other technology now known or developed in the future. As explained above, in a card-based transaction, a payment card is typically inserted into a POS terminal such that the POS terminal reads data from the EMV chip in order to conduct the transaction. In some card-based transactions, a POS terminal may instead read data from a magnetic stripe (not shown).

In an embodiment, an optional key 160 corresponds to a unique identifier. As will be discussed in greater detail below, key 160 can be used by one or more embodiments to identify the physical payment card 100 such that a valid account number can be provided to the cardholder via a trusted application. Other features of card 100 may function as a unique identifier that is used to access a valid account number. These other features may be supplied in addition to or instead of the key 160 shown in FIG. 1.

It should also be understood that physical payment card 100 may implement other technology that is not illustrated in FIG. 1. For example, a magnetic stripe might be present to facilitate swipe transactions. An antenna and associated electronics may be embedded within physical payment card 100 to facilitate contactless payment transactions. Any other technology that can be used to facilitate payment transactions can be present in physical payment card 100. There may also be non-technological features present in physical payment card 100. For example, a signature block may be present on physical payment card 100. The cardholder can sign the signature block. Thereafter, a person conducting the transaction can compare the cardholder's signature on a receipt with the signature contained in the signature block of physical payment card 100. There may also be a card security code (CSC), which will be discussed below in further detail.

4. Malicious Entity's Use of Payment Card

Figure 2:
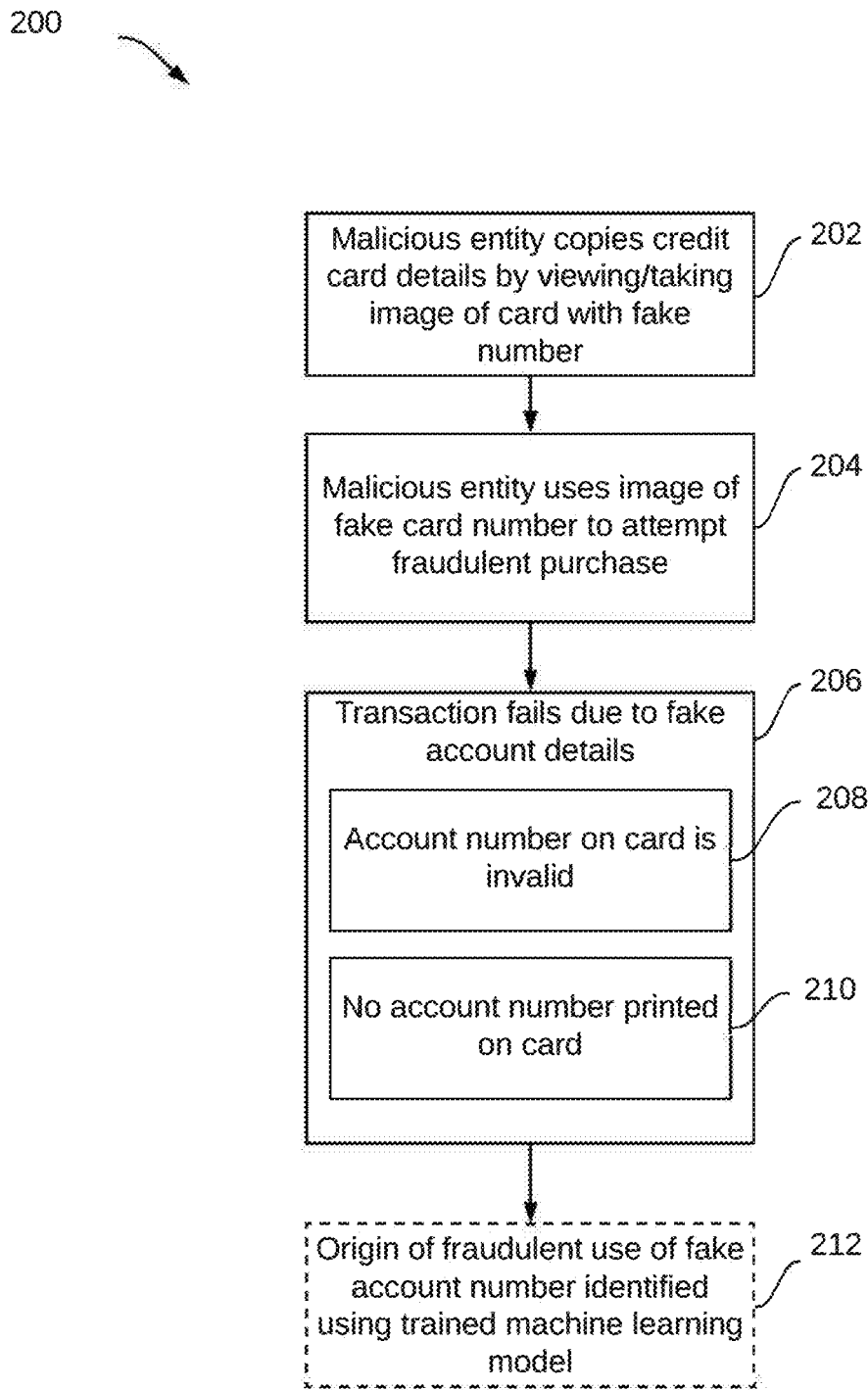
FIG. 2 is a flowchart illustrating the operation of one or more embodiments when a malicious entity attempts to use the physical payment card.

FIG. 2 illustrates an example method 200 involving a malicious entity attempting to complete a fraudulent transaction. A malicious entity is person who is not authorized to use physical payment card 100 or authorized to engage in financial transactions on behalf of an account owner associated with the physical payment card 100. As illustrated in the example method 200 in FIG. 2, a malicious entity gains access to the information on the front of physical payment card 100 (block 202). As discussed above, there are several ways in which a malicious entity can gain access to the information on the front of physical payment card 100. One common method is for a malicious entity to receive physical payment card 100 (such as at a restaurant or at a store) and copy the information from the front of physical payment card 100, such as fake account number 110, expiration date 130, and cardholder name 140. The malicious entity may also simply take a photograph of physical payment card 100.

The malicious entity may then attempt to use the information from the payment card 100 to fraudulently purchase an item (block 204). At a typical website or mobile application (or "app") or during a phone transaction, when making a purchase, the purchaser only needs to provide the name, account number, expiration date, and card security code. This information may be obtained from the payment card 100 itself. The purchaser may also need to provide an address.

In some situations, a card holder may also need to provide a card security code (CSC) to complete a transaction. The card security code (CSC) may also be referred to as a card verification value (CVV or CVV2), card validation code (CVC or CVC2), card identification code (CID), or card verification data (CVD). A CSC is typically a 3- or 4-digit number that is either printed on the front of the payment card (above the account number) or on the back of the payment card (on or next to a signature strip).

The CSC may be used to provide an added layer of security in "card not needed" transactions via several mechanisms. First, the CSC is not electronically stored on the payment card, either on the integrated circuit or the magnetic stripe. Because the CSC is not used for card-based transactions, it is not necessary for the information to be electronically accessible. Second, the CSC is not stored by a merchant. While some merchants may allow a cardholder to store account number information for an on-line account, they do not store the CSC. Despite these, a malicious entity with has access to information on the front of the payment card may also have access to the back of the payment card, where the CSC information may be located.

Continuing with the method 200, the malicious entity is ultimately foiled in completing a fraudulent transaction because the account details printed or embossed on the front or back of physical payment card 100 are not valid, thereby causing the transaction to fail (block 206).

There can be several ways in which the account details on the payment card are not valid. For example, the fake account number 110 that is printed on the card is not a valid account number (block 208). Because the number that is printed on the payment card is not necessary for card-based transactions, which may use account information encoded on the magnetic stripe or in the integrated circuit 150, there is no need for an account number to be printed on the payment card for a card-based transaction to be valid. In some embodiments, the fake account number 110 that is printed on physical payment card 100 is issued in such a manner to ensure that fake account number 110 does not correspond to an actual account number. For example, a credit card account number typically utilizes the Luhn algorithm to determine if the account number is a valid account number. If the number does not satisfy the Luhn algorithm, it is known that the account number is not valid. A merchant may have functionality that performs a Luhn algorithm check to determine if the entered account number is valid. If the fake account number 110 does not satisfy the Luhn algorithm, it is known that the malicious entity cannot fraudulently access the funds of a valid account when entering in fake account number 110.

In other embodiments, the financial institution that issued physical payment card 100 may set aside a range of account numbers that is knows are invalid. One of those account numbers can be used, to prevent a malicious entity from inadvertently entering valid account number by mistyping fake account number 110. A payment card issuer may wish to print a fake account number 110 on the payment card as a way to track or catch potential malicious entities. However, if a fake account number 110 is printed on the payment card, the malicious entity may be tempted to use the fake account number in a card-not-needed transaction, because the malicious entity will not realize that fake account number 110 is invalid. A merchant could then use the malicious entity's failed attempt at a card-not-needed transaction to locate and prosecute the malicious entity.

In some examples, a financial institution may use a trained machine learning model to identify a pattern of fake account number use to identify a malicious entity (block 212). For example, the trained machine learning model may identify one or more factors common to attempted uses of a fake number. Examples of common factors may include one or more of a card issuer identify, geographic locations associated with businesses receiving the fake number in an attempt to execute a transaction, geographic locations associated with IP addresses from which an attempted fraudulent transaction originates, device identities (e.g., MAC ID) of devices attempting fraudulent transactions, and/or patterns in the identities, internet addresses, geographic locations, or other characteristic parameters of electronic proxies used to conceal electronic characteristics of a device attempting a fraudulent transaction.

In a card-based transaction, the account information is gathered electronically, either from a magnetic stripe on physical payment card 100 or an integrated circuit 150 located on or embedded within the payment card. In some embodiments, there is no account number printed on the payment card at all (block 210). If a malicious entity sees a payment card with no account number printed on the payment card, the malicious entity will realize that the payment card information cannot be used to make a card-not-needed transaction and will not attempt to obtain the information.

5. Cardholder's Use of Payment Card

Figure 3:
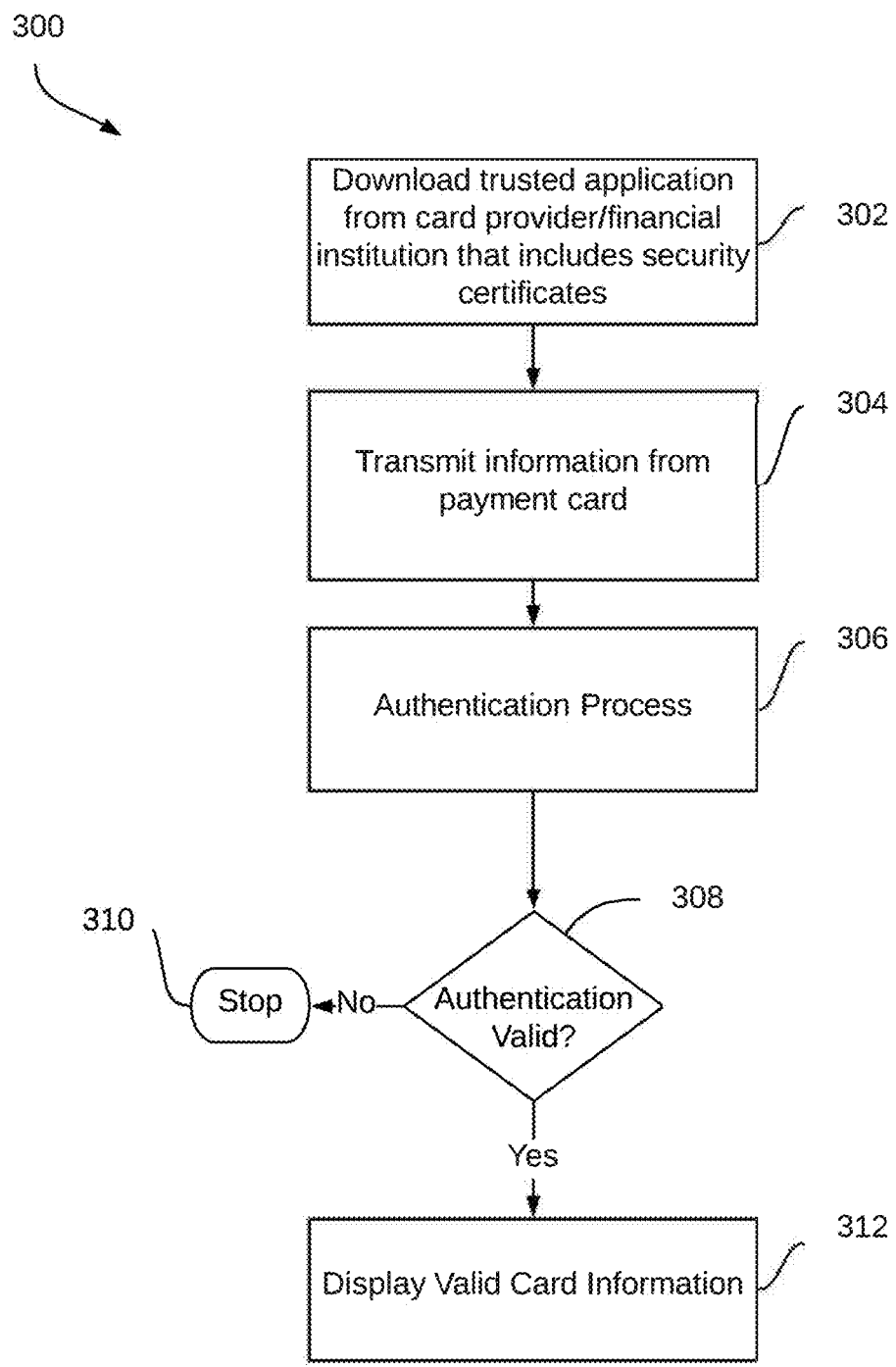
FIG. 3 is a flowchart illustrating the operation of one or more embodiments when a cardholder uses the physical payment card.

While an invalid (or not present) account number will prevent a malicious entity from using physical payment card 100, a valid cardholder may still wish to use physical payment card 100 for card-not-needed transactions. The cardholder desires a method to access the valid account number of the payment card. An example method 300 for this is presented in FIG. 3 in accordance with one or more embodiments.

A cardholder uses a computing device such as a laptop computer, desktop computer, tablet, smartphone, smart watch, or the like to download a trusted application ("app") from the payment card issuer (block 302). The trusted app would have security elements (e.g., certificates or other certifications) that allow the trusted app to verify the identity of the cardholder. In some embodiments, the cardholder might be asked to provide biometric identification such as facial recognition or the use of a fingerprint reader. In some embodiments, the cardholder might be asked to provide a username and password. In some embodiments, the cardholder might be asked to provide a personal identification number (PIN). In addition, because the app may be obtained from a central app store (e.g., Google's Play store or Apple's App Store or the Microsoft Store) or from the card issuer's website, the cardholder has greater confidence that the app is a valid app provided by the payment card issuer. Regardless of the measure (or measures) used, establishing a chain of trusted relationships between the application and the computing device of the cardholder, and between the cardholder and the application provides layers of security not normally found in more traditional card not present transactions.

The cardholder then transmits information obtained from physical payment card 100 to the payment card issuer via the trusted app (block 304). The information obtained from the payment card can be any type of information. The information can simply involve transmitting the fake account number 110 from physical payment card 100.

In some embodiments, the information obtained from physical payment card 100 can be electronically obtained from physical payment card 100. For example, there may be a near field communication (NFC) technology within physical payment card 100 that can be accessed through the use of the app and be used to transmit card information to the card issuer. In some embodiments, the cardholder may have the capability to read the magnetic stripe or the integrated circuit 150 within the payment card which may also be used to transmit card information to the card issuer. Regardless of the technique used, information can be transmitted via the trusted app so as to acquire a valid account number—not present on the card itself or stored in the mobile application—for use in a transaction.

In some embodiments, the information obtained from physical payment card 100 can be provided by sending a photograph of physical payment card 100 to the card issuer through the use of the app. For example, the app can have access to the camera of the smart phone on which the app is installed. Using the app, the cardholder can take a photograph of physical payment card 100 and send the photograph to the payment card issuer. The photograph of physical payment card 100 can be used by the app to process information located on the payment card.

The photograph of physical payment card 100 can be used to extract any type of information stored in any type of manner on physical payment card 100. There may be several ways to accomplish this task. This can be accomplished by analyzing the photograph of physical payment card 100 to determine the fake account number 110 that is printed on the payment card. Although fake account number 110 is not a valid account number, it may be a number that is uniquely associated to the cardholder. Thus, the photograph of the payment card confirms that the cardholder is in possession of the payment card.

In some embodiments, other sections of physical payment card 100 may be analyzed once the photograph of the payment card is received. For example, FIG. 1 shows key 160 being occupied by a quick response (QR) code. The QR code can contain any type of unique identifying information. As illustrated in FIG. 1, the QR code may contain the fake account number 110. However, any type of information can be used as the unique identifying information. In some embodiments, the unique identifying information is randomly generated, such as a universally unique identifier (UUID). It should be understood that, although the unique identifying information may be used to confirm the identity of the cardholder, the unique identifying information cannot be used by itself to execute a payment transaction. The unique identifying information is used in conjunction with the app downloaded in block 302 in a manner explained in more detail below with respect to block 306. Thus, a malicious entity will not be able to decode the QR code located in key 160 and use the decoded information to conduct a financial transaction.

While a QR code is illustrated in FIG. 1, other methods of providing unique identifying information can be used. For example, the unique identifying information can be contained (e.g., encoded using techniques detectable by the mobile app via the camera) in the name and/or logo 120 of the payment card issuer. The unique identifying information may be located in the background area 170 of physical payment card 100. The unique identifying information may be a cryptographic key, where decryption of the key generates the valid account number. Decryption of the cryptographic key would be performed by the app. In some embodiments, the key could be a public cryptographic key that is unlockable by a private key that is stored within the app.

The cardholder and payment card are authenticated (block 306). This can be accomplished in one of a variety of different manners. The cardholder's authentication with the app can be used in conjunction with the information obtained from physical payment card 100 to generate the authorization. In other words, the fact that the cardholder has possession of information needed to log in to the app (such as a user id and password or biometric information) is used as one factor for the authentication of the cardholder. The possession of the payment card (which the cardholder shows in block 304) is a second factor for the authentication of the cardholder. Satisfaction of both factors authenticates the cardholder and the method can proceed. If the authentication fails (block 308), the method stops (block 310).

If the authentication is successful, the app is used to display the relevant information to the cardholder (block 312). For example, a valid account number can be displayed to the cardholder. The cardholder is then able to perform a card-not-needed transaction using the displayed valid account number along with all of the cardholder's other information (e.g., name, address, expiration date, and CSC). The cardholder would provide the account number to the merchant of the card-not-needed transaction and the remainder of the transaction would occur in a typical manner.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
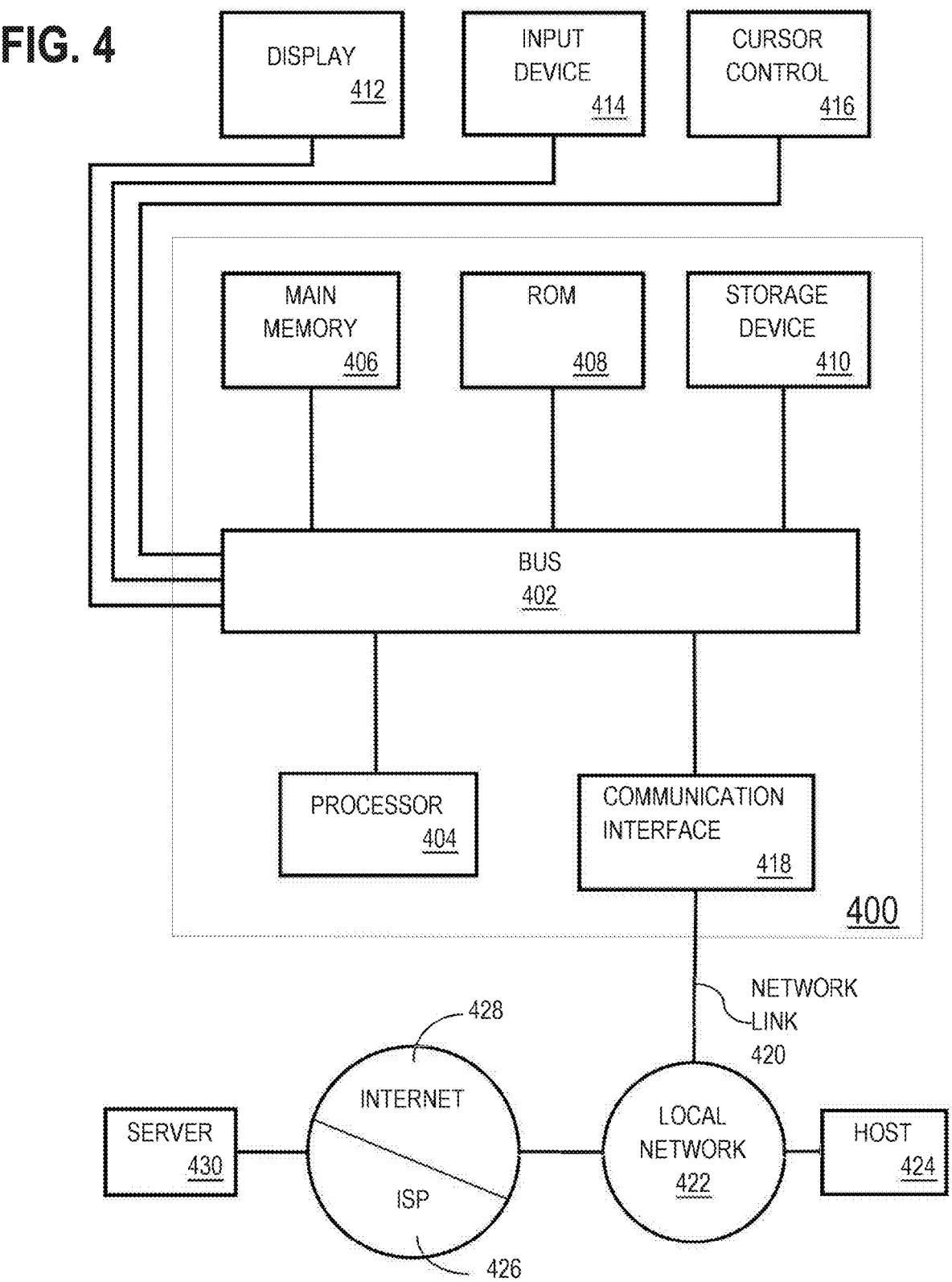
FIG. 4 illustrates a block diagram of a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or flash storage is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 440 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A physical payment card comprising:
   a first surface and a second surface opposite the first surface;
   at least one electronic account-number-extraction-element configured to interact with a transaction terminal to initiate a first financial transaction between the transaction terminal and a computing system configured to authorize financial transactions;
   a fake account number printed on the first surface of the physical payment card, wherein the fake account number cannot be used for executing the any financial transaction based on funds associated with the physical payment card; and
   a key printed in a background area of the first surface of the physical payment card, wherein the key is mapped to a valid account number not printed on the physical payment card, the key used for retrieving and displaying, by an application running on a computing device, the valid account number for executing a second financial transaction based on funds associated with the physical payment card,
   wherein the computing system configured to authorize financial transactions authorizes the first financial transaction based on valid account number data extracted from the account-number-extraction-element,
   wherein the computing system configured to authorize financial transactions authorizes the second financial transaction based on the valid account number retrieved and displayed by the application running on the computing device, and
   wherein the computing system configured to authorize financial transactions refrains from authorizing a third financial transaction based on the fake account number.

2. The physical payment card of claim 1, wherein the key comprises one of an image printed in the background area on the first surface of the physical payment card or data detectable by a near-field communication device.

3. The physical payment card of claim 1, wherein the physical payment card has a rectangular shape.

4. The physical payment card of claim 1, wherein retrieving and displaying, by the application running on the computing device, the valid account number comprises:
   taking a picture, by the computing device, of the physical payment card; and
   processing, by the application, the picture of the physical payment card to extract the key from the picture;
   wherein
   the application transmits the key to an account number mapping system, and
   wherein the application receives, responsive to transmitting the key to the account number mapping system, the valid account number from the account number mapping system.

5. The physical payment card of claim 4, wherein the account number mapping system includes a mapping of the key obtained from the physical payment card to the valid account number, and
   wherein the mapping does not include the fake account number.

* * * * *

UNITED STATES PATENT AND TRADEMARK OFFICE
CERTIFICATE OF CORRECTION

PATENT NO. : 11,823,200 B2
APPLICATION NO. : 16/920935
DATED : November 21, 2023
INVENTOR(S) : Anantharaju Page 1 of 1

It is certified that error appears in the above-identified patent and that said Letters Patent is hereby corrected as shown below:

On the Title Page

Column 2, under Abstract, Line 12, delete "They" and insert -- The --, therefor.

In the Specification

In Column 4, Line 3, delete "future" and insert -- future. --, therefor.

In the Claims

In Column 12, Line 14, in Claim 1, after "executing" delete "the".

Signed and Sealed this
Eleventh Day of June, 2024

Katherine Kelly Vidal
*Director of the United States Patent and Trademark Office*